US008991926B2

(12) United States Patent
Johansson

(10) Patent No.: US 8,991,926 B2
(45) Date of Patent: Mar. 31, 2015

(54) BACKREST FOR WHEELCHAIR

(75) Inventor: Ulf Johansson, Älmhult (SE)

(73) Assignee: Invacare International Sarl, Gland (CH)

( * ) Notice: Subject to any disclaimer, the term of this patent is extended or adjusted under 35 U.S.C. 154(b) by 87 days.

(21) Appl. No.: 13/595,154

(22) Filed: Aug. 27, 2012

(65) Prior Publication Data

US 2013/0099542 A1 Apr. 25, 2013

(30) Foreign Application Priority Data

Aug. 29, 2011 (EP) .................................... 11179224

(51) Int. Cl.
*B60N 2/00* (2006.01)
*A61G 5/10* (2006.01)
*A61G 5/12* (2006.01)

(52) U.S. Cl.
CPC ................ *A61G 5/1043* (2013.01); *A61G 5/12* (2013.01); *A61G 2005/1048* (2013.01); *A61G 2005/122* (2013.01); *Y10S 297/04* (2013.01)
USPC ................ 297/354.12; 297/284.4; 297/440.2; 297/440.21; 297/353; 297/452.63; 297/DIG. 4; 297/354; 280/304.1

(58) Field of Classification Search
USPC ......... 297/354.12, 354.1, 440.2, 440.21, 353, 297/284.9, 350, 452.33, 452.34, 452.63, 297/284.4, DIG. 4; 280/304.1
See application file for complete search history.

(56) References Cited

U.S. PATENT DOCUMENTS

| | | | | |
|---|---|---|---|---|
| 3,258,259 | A * | 6/1966 | Bohlin | 267/89 |
| 4,813,693 | A * | 3/1989 | Lockard et al. | 280/42 |
| 4,981,325 | A * | 1/1991 | Zacharkow | 297/284.1 |
| 5,518,294 | A * | 5/1996 | Ligon et al. | 297/284.4 |
| 5,549,357 | A * | 8/1996 | Counts et al. | 297/354.13 |
| 5,556,168 | A * | 9/1996 | Dinsmoor et al. | 297/440.2 |
| 5,593,211 | A * | 1/1997 | Jay et al. | 297/383 |
| 6,095,611 | A * | 8/2000 | Bar et al. | 297/440.21 |
| 6,186,594 | B1 * | 2/2001 | Valiquette et al. | 297/284.4 |
| 6,257,664 | B1 * | 7/2001 | Chew et al. | 297/284.9 |
| 6,913,318 | B2 * | 7/2005 | Higley et al. | 297/383 |
| 7,188,902 | B1 * | 3/2007 | Chen | 297/357 |
| 7,980,580 | B2 * | 7/2011 | Loewenthal et al. | 280/304.1 |
| 2003/0030318 | A1 * | 2/2003 | Christofferson et al. | 297/452.34 |
| 2003/0102706 | A1 * | 6/2003 | Float et al. | 297/440.2 |
| 2006/0091706 | A1 | 5/2006 | Christofferson et al. | |
| 2010/0276974 | A1 * | 11/2010 | Huttenhuis | 297/284.3 |

* cited by examiner

*Primary Examiner* — Chi Q Nguyen
(74) *Attorney, Agent, or Firm* — Calfee, Halter & Griswold LLP

(57) ABSTRACT

A backrest for a wheelchair includes an adjustable cushion support, a backrest frame, and attachment members. The adjustable cushion support supports a backrest cushion, and substantially defines plane P1. The backrest frame holds the cushion support and has two substantially parallel side posts substantially defining a plane P2. The attachment members attach the cushion support to the backrest frame. The cushion support comprises two side bars and a plurality of transversally extending and vertically spaced apart flexible straps. Each strap is length adjustable. The cushion support comprises at least two connecting plates. Each plate being integral with one of the side bars and being provided with at least two parallel adjustment slots. The slots define an angle α, with said plane P1 of the adjustable support cushion. The attachment members are slidably mounted on the slots, enabling depth, width and angular adjustment of the cushion support on the backrest frame.

14 Claims, 9 Drawing Sheets

BACKREST FOR WHEELCHAIR

RELATED APPLICATIONS

The present application claims the benefit of European Patent Application No. 11179224.8, filed on Aug. 29, 2011, which is incorporated herein by reference in its entirety.

FIELD OF THE INVENTION

The present invention relates to a backrest for a wheelchair provided with an adjustable cushion support, a backrest frame for holding said cushion support and attachment members, for attaching said cushion support to said backrest frame.

BACKGROUND OF THE INVENTION

Many backrests types are known in the art. Most backrests are attached to a frame and do not allow any adjustment possibilities. Adjustable backrests are also known. For instance, document US 2006/0091706, Christofferson et al. "Seat assembly for wheelchair", describes a typical seat assembly that can be mounted on various wheelchair bases. The seat assembly enables the seat width and backrest width to be adjusted independently of each other. The backrest has a plurality of open slots, the number and orientation of which contributes to depth, width, and height adjustment of the backrest as well as angular adjustment of lateral supports to permit the backrest to conform to the anatomical curves of a user. A first set of slots is provided for height adjustment of the thoracic support. Further slots are provided for lateral adjustment of the thoracic support. Threaded fasteners provided in adjustment holes are provided for height adjustment of the backrest with respect to a main member. In the disclosed embodiment, all adjustments are made independently, involving time consuming manipulations. Moreover, once a first adjustment has been made with a first member, further adjustments of this first member may be required after another member is adjusted. Finally, in this known wheelchair, the backrest comprises a central part and two lateral parts which are rigid. Therefore, it is not possible to deform these parts so as to adapt the shape of the backrest to the anatomical curves of a user.

SUMMARY OF THE INVENTION

According to the invention, a backrest for a wheelchair, comprises:

- an adjustable cushion support, for supporting a backrest cushion, said cushion support defining substantially a first plane P1;
- a backrest frame, for holding said cushion support, said backrest frame having two substantially parallel first side posts defining substantially a second plane P2;
- attachment members, for attaching said cushion support to said backrest frame;
- said cushion support comprising two side bars and a plurality of transversally extending and vertically spaced apart flexible straps each interconnecting said two side bars, each strap having length adjustment;
- said cushion support comprising at least two connecting plates, each plate being integral with one of said side bars and being provided with at least two parallel adjustment slots, said slots defining an angle $\alpha$, with said first plane P1;

- said attachment members being slidably mounted on said slots, enabling depth, width and angular adjustment of said cushion support on said backrest frame.

With such an arrangement, the parallel slots enable adjustment of the position of the cushion support with regard to the backrest frame. Adjustment is thus easier and quicker to perform than standard configurations having separate adjustments.

Moreover, the flexible and length-adjustable straps of the cushion support enable separate adjustment of each side bar of said cushion support. Thus, the shape of the cushion support may advantageously be adapted to the morphology of the user.

The invention also provides a wheelchair having a backrest according to the above-mentioned characteristics.

BRIEF DESCRIPTION OF THE DRAWINGS

The invention will be better understood with the aid of the description of an embodiment given by way of example and illustrated by the figures, in which.

DETAILED DESCRIPTION OF THE INVENTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In one exemplary embodiment, the present invention provides a wheelchair that is adjustable in a quick and easy way. In one exemplary embodiment, the present invention provides a backrest that may be manufactured with reasonable equipment requirements in a cost effective way. In one exemplary embodiment, the present invention provides a backrest that may be deformed so as to adapt its shape to the anatomical curves of a user.

Figure 1:
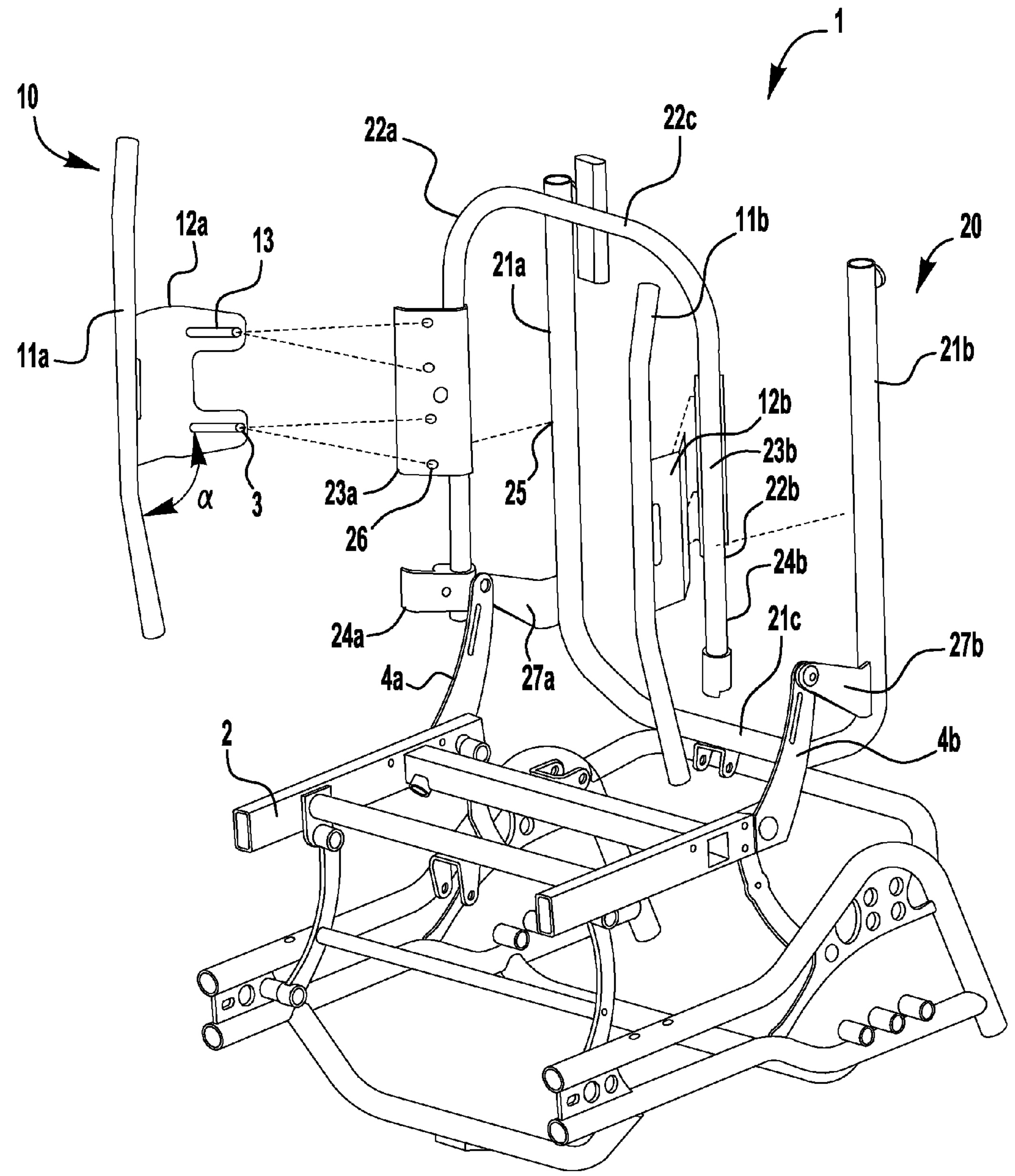
FIG. 1 illustrates a partially exploded front perspective view of a backrest according to the invention, when connected to a wheelchair seat.

FIG. 1 illustrates a perspective view of the backrest 1, when it is connected to the seat frame 2 of a wheelchair. So as to improve the understanding, some components have been shown in exploded view and some other components have been partially removed. Further details of the backrest 1 may also be seen on FIG. 2.

Figure 2:
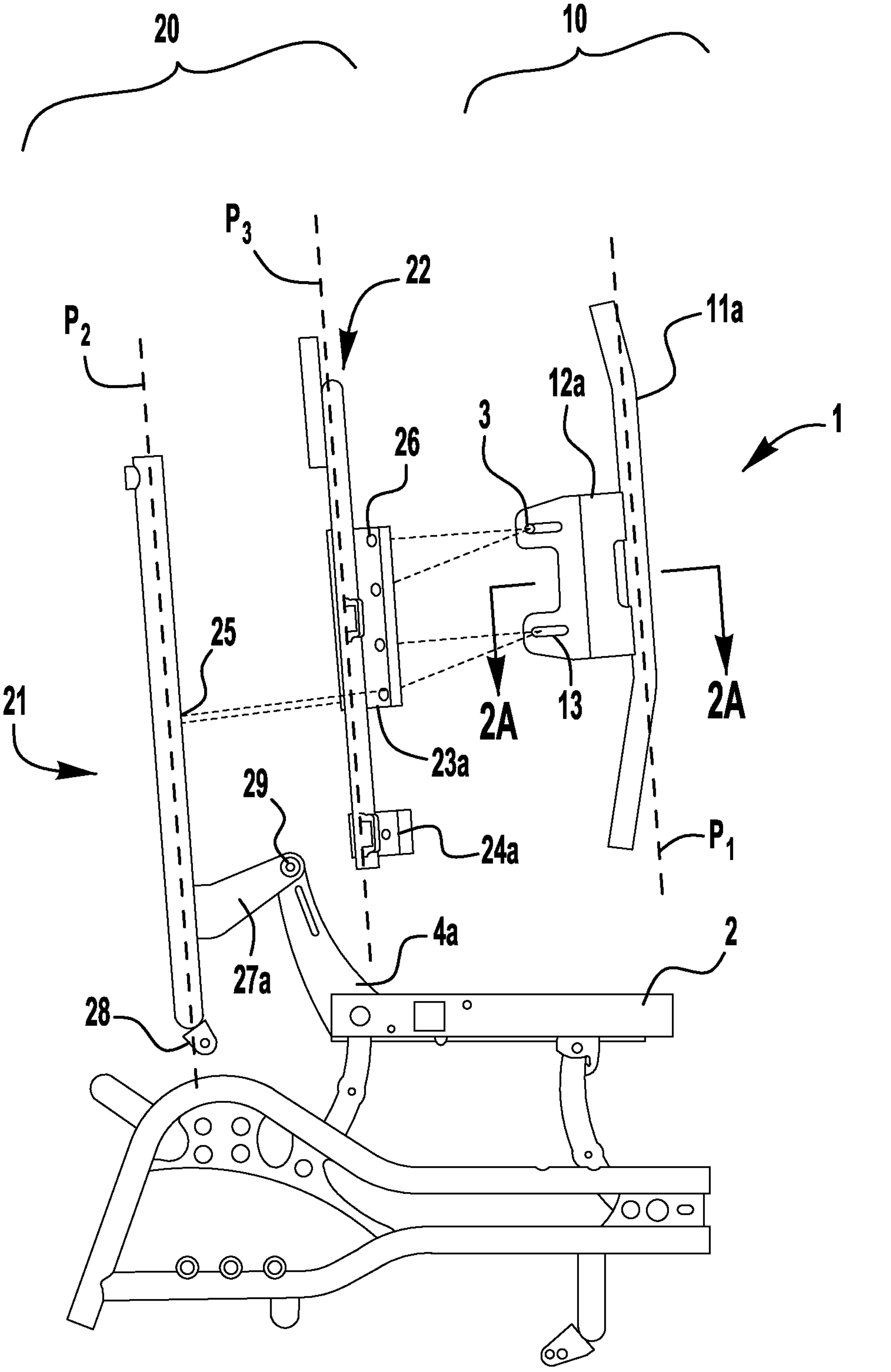
FIG. 2 is a partially exploded side view of the backrest of FIG. 1.
Figure 2A:
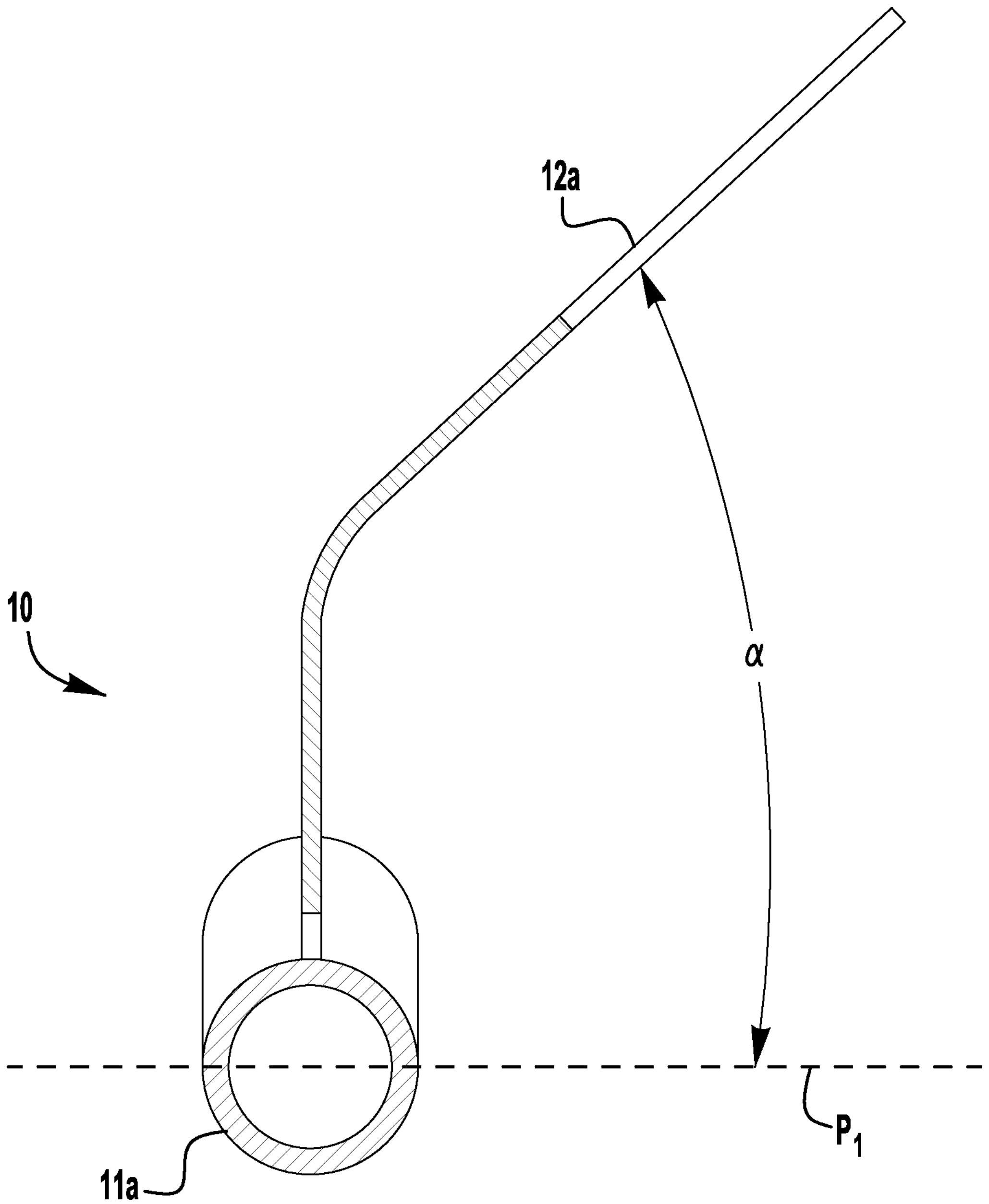
FIG. 2A is a sectional view taken along the plane indicated by lines 2A-2A in FIG. 2.

The backrest 1 comprises two main parts, i.e. a cushion support 10 supporting a backrest cushion (not shown) and a backrest frame 20 holding said cushion support 10. The backrest cushion may be made with foam or other soft material to provide more comfort for the user. A covering may also be provided. The cushion support 10 is attached to the backrest frame 20 by means of attachment members 3. In the illustrated embodiment, said attachment members 3 consist in bolts or screws adapted to be threadedly received in a series of threaded holes 25 formed inside two side posts 21*a* and 21*b* of the backrest frame 20. Said side posts 21*a* and 21*b* are linked at their lower ends by a connection profile 21*c* so as to form a first U-shape element 21 defining approximately a plane P2. Said first U-shape element 21 is removably connected to a second U-shape element 22 comprising two side posts 22*a* and 22*b* linked at their upper ends by a connection profile 22*c*, said second U-shape element 22 defining a plane P3 close to and approximately parallel to the plane P2. Said elements 21 and 22 may for instance be clamped together by using upper clamping elements 23*a*, 23*b* and lower clamping elements 24*a*, 24*b* positioned respectively in the upper part and in the lower part of each side post 22*a* and 22*b*. Each clamping elements 23*a*, 23*b* and 24*a*, 24*b* may consist for instance in a plate bent at its two side ends so as to define an internal space inside which one of said side posts 22*a* or 22*b* and corresponding side post 21*a* or 21*b* are tightly disposed. As illustrated in FIGS. 1 and 2, when the elements 21 and 22 are connected together, the upper clamping elements 23*a*, 23*b* may advantageously be positioned along the side posts 21*a* and 21*b* respectively so as to cover a section of said side posts 21*a* and 21*b* comprising the threaded holes 25. Accordingly, corresponding holes 26 are formed in said upper clamping elements 23*a*, 23*b* so that said holes 25 and 26 are axially aligned when said elements 21 and 22 are connected together.

Figure 8:
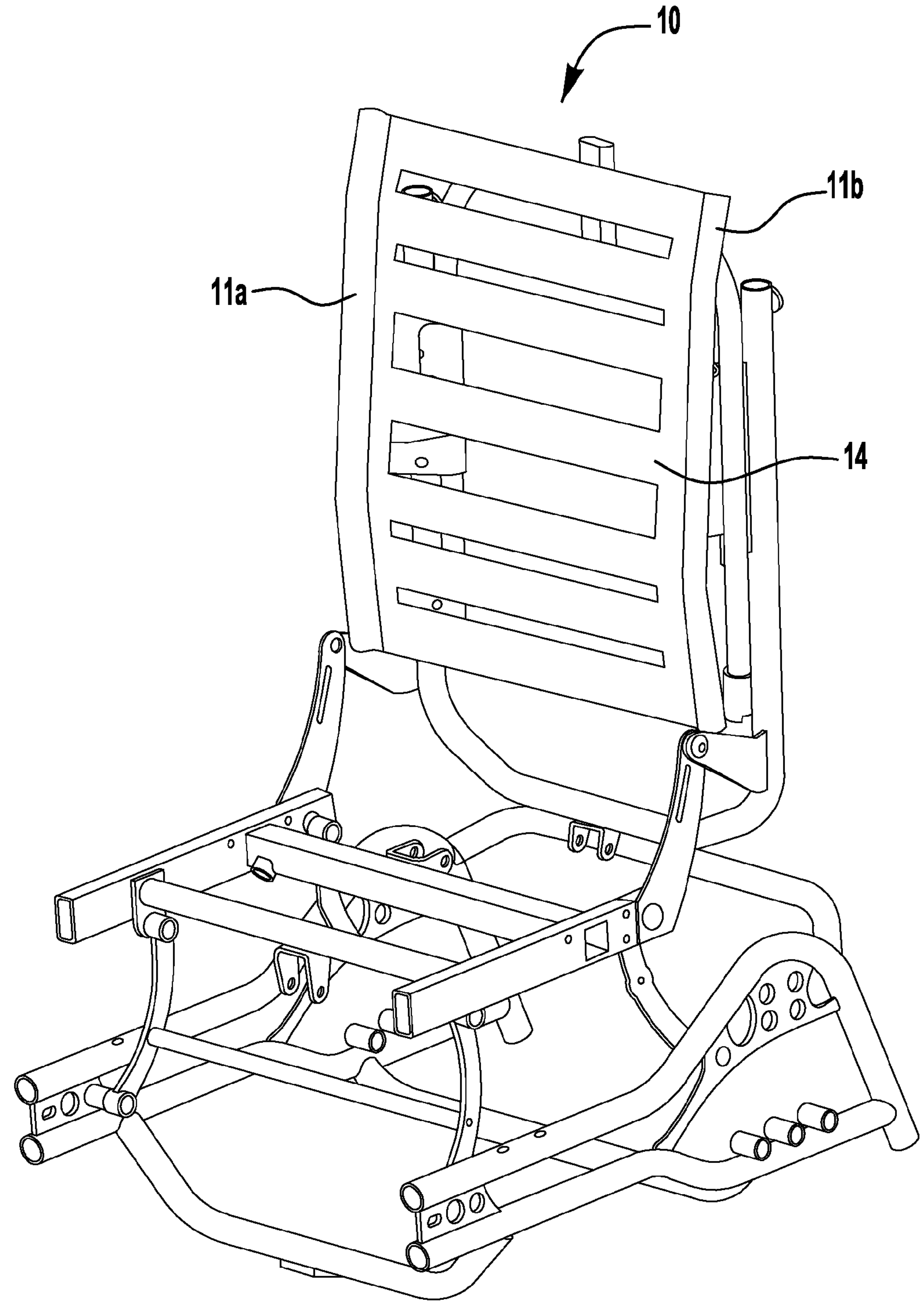
FIG. 8 is a front perspective view of the backrest of FIG. 1, showing the complete structure of the cushion support.

As shown in greater details in FIG. 8, the cushion support 10 comprises two side bars 11*a* and 11*b* and a plurality of transversally extending and vertically spaced apart flexible straps 14, each strap 14 interconnecting said two side bars 11*a* and 11*b* and each strap 14 being adjustable in length. In adjusting the length of said straps, the tension of said straps may be changed in conformity with the user's need. In one preferred embodiment (not shown). The adjustable length of the straps 14 may be provided by Velcro (registered trademark) fasteners provided on one side of the straps 14 and in complementary Velcro (registered trademark) fasteners provided on the other side of the straps 14. The side bars 11*a* and 11*b* may be straight or, as illustrated in FIGS. 1 and 2, may be formed by two straight end sections linked to a straight middle section so that said end sections are inclined with regard to the middle section. In the position of use of the backrest 1, the middle sections of the side bars 11*a* and 11*b* will be advantageously positioned so as to be parallel in a plane P1. The cushion support 10 comprises also two connecting plates 12*a* and 12*b*, each plate 12*a* and 12*b* being integral with one of said side bars 11*a* and 11*b* and being provided with two parallel adjustment slots 13. In a further embodiment (not shown) of the invention, said plates 12*a* and 12*b* may also comprise a greater number of slots 13. The slots 13 of each plates 12*a* and 12*b* are advantageously aligned in a plane forming with the plane P1 an angle $\alpha$, $\alpha>0$, said angle $\alpha$ lying preferably between 30° and 60°, and more preferably, being approximately equal to 45°. Said slots 13 may have a length lying between 10 mm and 50 mm, and, preferably, a length approximately equal to 35 mm when said angle $\alpha$ is approximately equal to 45°.

To adjust the depth and angular position of the cushion support 10 with regard to the backrest frame 20, the attachment members 3, i.e. bolts or screws, are slidably mounted on the adjustment slots 13. Adjustment may be made in a very simple and quick way. When the bolts or screws 3 are slightly loosened, that is to say enough to allow the bolts or screws 3 to slide inside the slots 13, but not enough to allow complete removal of the cushion support 10 from the backrest frame 20, the plates 12*a* and 12*b*, together with the side bars 11*a* and 11*b*, may be independently moved backward, forward or inclined and adjusted along a position allowing a maximum comfort for the user. In order to change the position of the bolts or screws 3 inside the slots 13, said slots 13 should advantageously be large enough to allow said bolts or screws to pivot as a group in said slots without being removed from said slots. Once an appropriate position is reached, the plates 12*a* and 12*b* are secured with the bolts or screws 3 against the clamping elements 23*a* and 23*b* respectively. This operation simultaneously allows securing said clamping elements 23*a* and 23*b* against the side posts 21*a* and 21*b* respectively. In this way, the cushion support 10 is firmly held against the backrest frame 20. The position of the cushion support 10 with regard to the backrest frame 20 may also be modified in height by introducing the bolts or screws 3 in other holes 25 and 26 as illustrated in dotted lines in FIGS. 1 and 2.

The slots 13 enable a very wide choice of potential positions. Some examples of said potential positions are illustrated in FIGS. 3*a*, 3*b*, 4*a*, 4*b*, 5*a*, 5*b*, 6*a*, 6*b* and 7. In the above mentioned Figures, the slots 13 may be defined as a straight segment extending between a proximal end 13*p* and a distal end 13*d*, said proximal end 13*p* being closer to the plane P1 than the distal end 13*d*. In addition, the two slots 13, respectively an upper slot 13' and a lower slot 13", of each plate 12*a* and 12*b* are aligned in a plane forming with the plane P1 an angle approximately equal to 45°. This specific configuration permits a simultaneous and similar change of the depth position of the cushion support 10 with regard to the backrest frame 20 and of the width of the cushion support 10. Said depth position may be defined by the distance between the plane P1 and the plane P2 and said width may be defined by the distance between the middle sections of the side bars 11*a* and 11*b*.

Figure 3A:
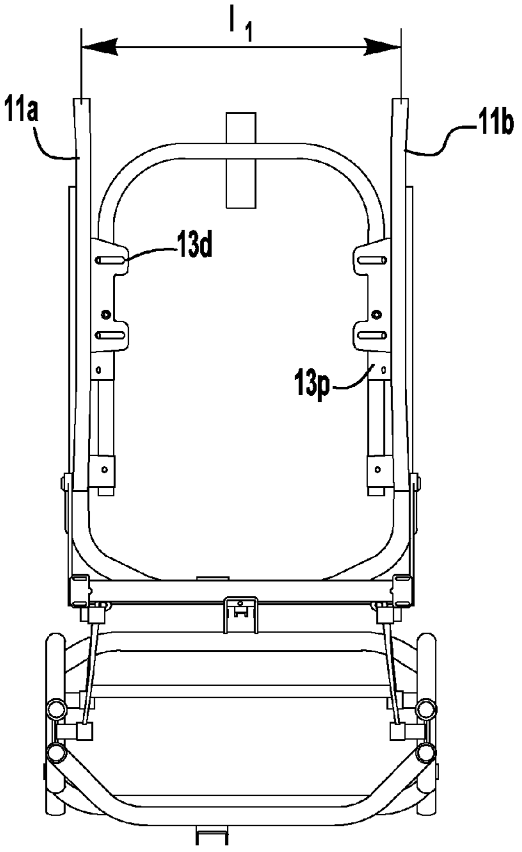
FIGS. 3*a* and 3*b* are, respectively, a front view and a side view of the backrest of FIG. 1, in a first position of use.
Figure 3B:
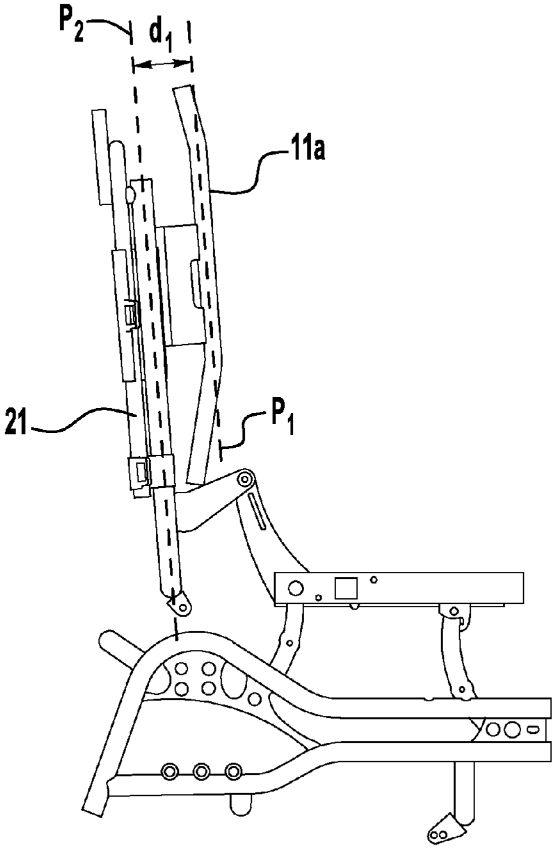

Thus, when all bolts or screws 3 are aligned with the proximal ends 13*p* of the slots 13, as illustrated in FIGS. 3*a* and 3*b*, the planes P1 and P2 are approximately parallel and the cushion support 10 is positioned in its less wide position, the distance $d_1$ between the planes P1 and P2 and the distance $I_1$ between the side bars 11*a* and 11*b* being minimum.

Figure 4A:
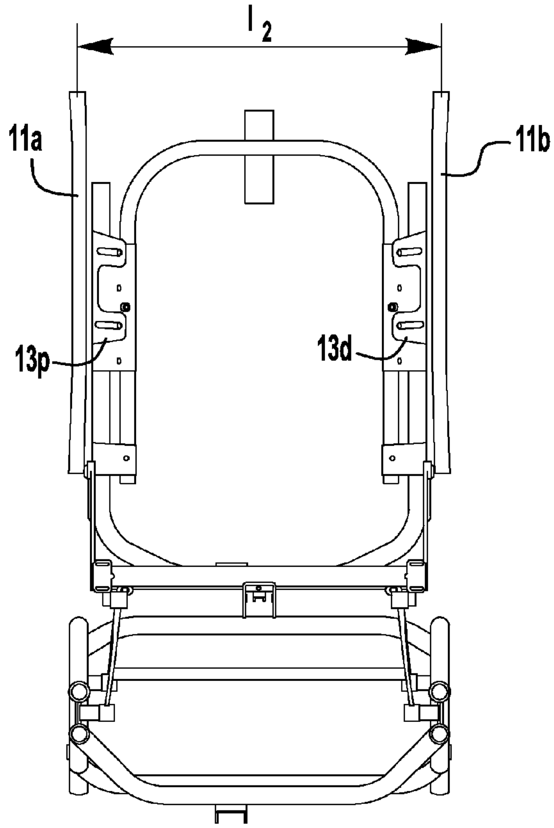
FIGS. 4*a* and 4*b* are, respectively, a front view and a side view of the backrest of FIG. 1, in a second position of use.
Figure 4B:
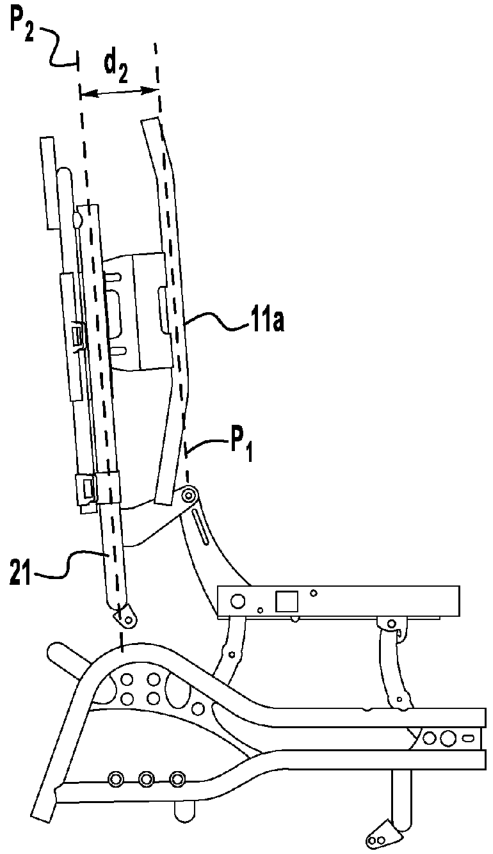

On the contrary, when all bolts or screws 3 are aligned with the distal ends 13*d* of the slots 13, as illustrated in FIGS. 4*a* and 4*b*, the planes P1 and P2 stay approximately parallel but the cushion support 10 is positioned in its widest position, the distance $d_2$ between the planes P1 and P2 and the distance $I_2$ between the side bars 11*a* and 11*b* being maximum.

Figure 5A:
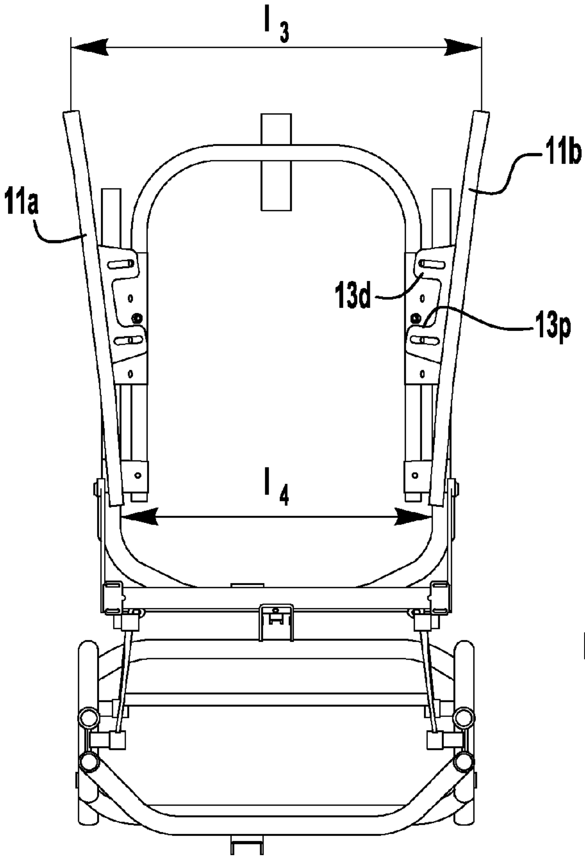
FIGS. 5*a* and 5*b* are, respectively, a front view and a side view of the backrest of FIG. 1, in a third position of use.
Figure 5B:
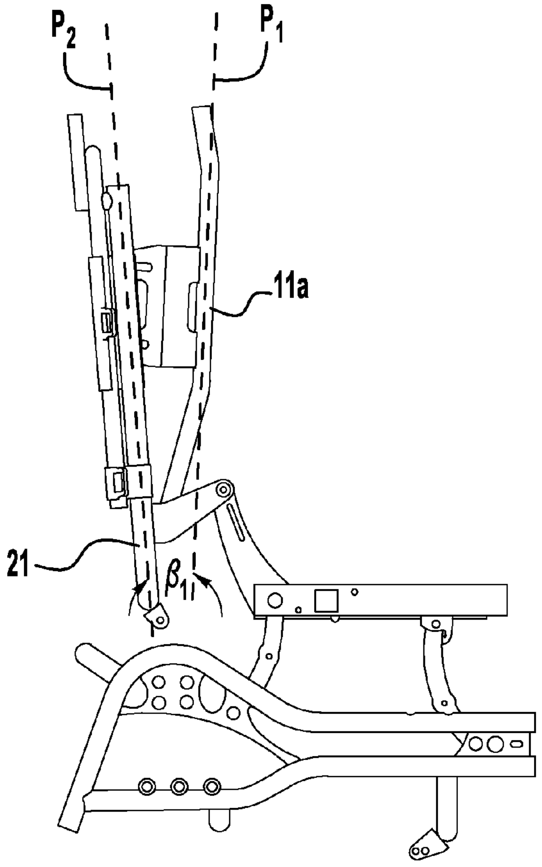

In the configuration illustrated in FIGS. 5*a* and 5*b*, the bolts or screws 3 received in the upper slots 13' are closer to the distal ends 13*d* than to the proximal ends 13*p* of said upper slots 13' and, inversely, the bolts or screws 3 received in the lower slots 13" are closer to the proximal ends 13*p* than to the distal ends 13*d* of said lower slots 13". Thus, in this configuration, the plane P1 is inclined forward with regard to the plane P2, said plane P1 forming an angle $\beta$1 with said plane P2 and the distance $I_3$ separating the upper sections of the side bars 11*a* and 11*b* being higher than the distance $I_4$ separating the lower sections of the side bars 11*a* and 11*b*. This configuration is well adapted for a man, because a man is generally broad-shouldered and has thin hips.

Figure 6A:
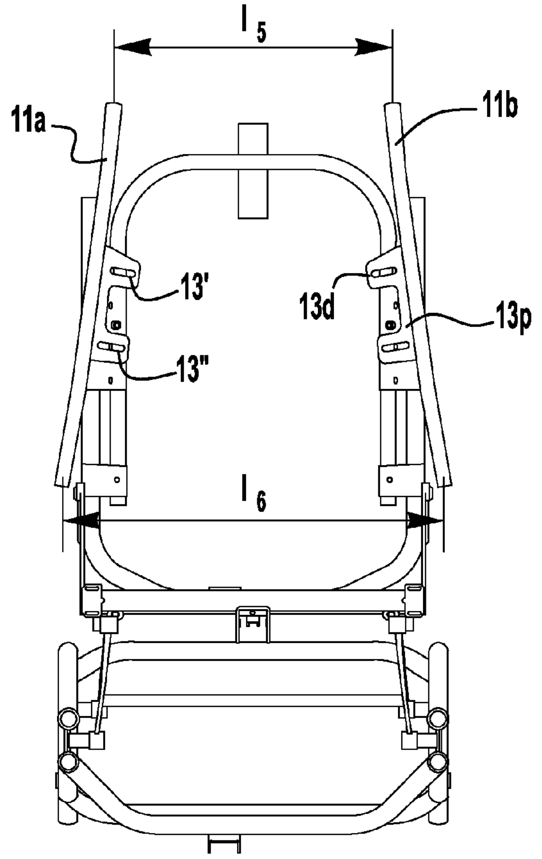
FIGS. 6*a* and 6*b* are, respectively, a front view and a side view of the backrest of FIG. 1, in a fourth position of use.
Figure 6B:
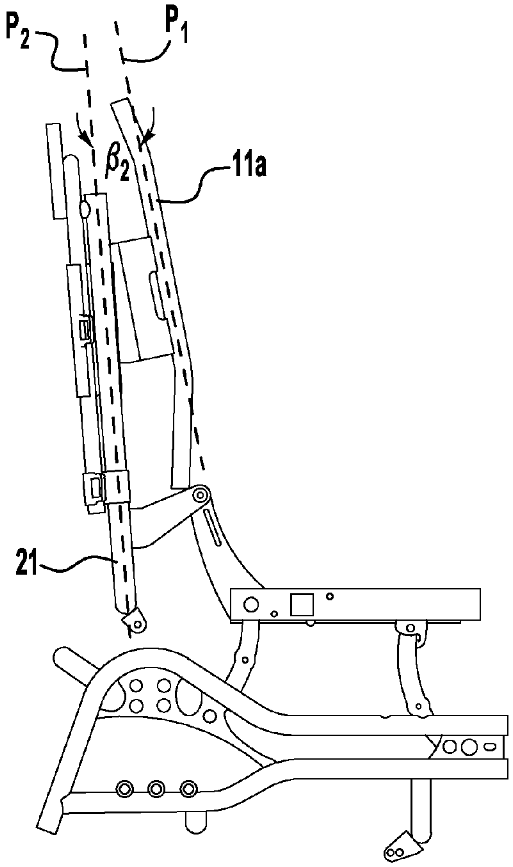

In the configuration illustrated in FIGS. 6*a* and 6*b*, the bolts or screws 3 received in the upper slots 13' are closer to the proximal ends 13*p* than to the distal ends 13*d* of said upper slots 13' and, inversely, the bolts or screws 3 received in the lower slots 13" are closer to the distal ends 13*d* than to the proximal ends 13*p* of said lower slots 13". Thus, in this configuration, the plane P1 is inclined backward with regard to the plane P2, said plane P1 forming an angle β2 with said plane P2 and the distance $I_5$ separating the upper sections of the side bars 11*a* and 11*b* being lower than the distance $I_6$ separating the lower sections of the side bars 11*a* and 11*b*. This configuration is well adapted for a woman, because a woman is generally thin-shouldered and has broad hips.

Figure 7:
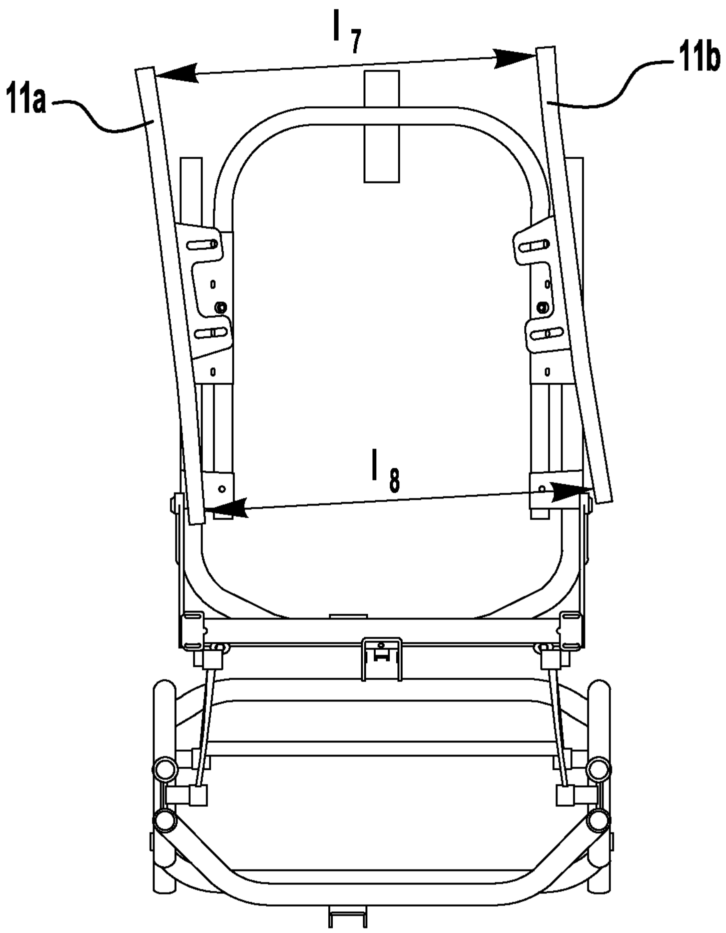
FIG. 7 is a front view of the backrest of FIG. 1, in a fifth position of use.

In the configuration illustrated in FIG. 7, the bolts or screws 3 received respectively in the upper slot 13' of the side bar 11*b* and in the lower slot 13" of the side bar 11*a* are closer to the proximal ends 13*p* than to the distal ends 13*d* of said upper and lower slots and, inversely, the bolts or screws 3 received respectively in the lower slots 13" of the side bar 11*b* and in the upper slot 13' of the side bar 11*a* are closer to the distal ends 13*d* than to the proximal ends 13*p* of said lower and upper slots. Thus, in this configuration, the plane P1 is inclined sideways with regard to the plane P2 and the distance $I_7$ separating the upper sections of the side bars 11*a* and 11*b* being approximately equal to the distance $I_8$ separating the lower sections of the side bars 11*a* and 11*b*. This configuration is well adapted for a person suffering of scoliosis.

In the illustrated embodiment of FIGS. 1 and 2, the backrest frame 20 is pivotally connected to the seat frame 2 around the axis 29. In particular, two arms 27*a* and 27*b* extending in a direction approximately perpendicular to the plane P2 and integral with, respectively, the side posts 21*a* and 21*b* are pivotally connected to corresponding arms 4*a* and 4*b* of the seat frame 4, said arms 4*a* and 4*b* extending in a direction close to the vertical or slightly inclined with regard to the vertical. In order to modify the inclination of the backrest frame 20 with regard to the seat frame 2, a gas piston (not shown) fixedly connected to the seat frame 2 may be connected at its free end to a connecting structure 28 positioned underneath and in the center of the connection profile 21*c* of the backrest frame 20.

The above detailed description with reference to the drawings illustrates rather than limit the invention. There are numerous alternatives, which fall within the scope of the appended claims. For instance, the clamps and holder members are shown with screws and nuts. Other types of fastening means may also be used without departing from the invention.

The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude a combination of additional features, which corresponds to a combination of dependent claims.

The invention claimed is:

1. A backrest for a wheelchair, comprising:
- an adjustable cushion support, for supporting a backrest cushion, said cushion support defining substantially a first plane P1;
- a backrest frame, for holding said cushion support, said backrest frame having two substantially parallel first side posts defining substantially a second plane P2;
- attachment members, for attaching said cushion support to said backrest frame;
- said cushion support comprising two side bars and a plurality of transversally extending and vertically spaced apart flexible straps each interconnecting said two side bars, each being adjustable in length;
- said cushion support comprising at least two connecting plates, each plate being integral with one of said side bars and being provided with at least two parallel adjustment slots, said slots defining an angle α, with said first plane P1;
- said attachment members being slidably mounted on said slots, enabling depth, width and angular adjustment of said cushion support on said brackrest frame; and wherein the angle lies between 30° and 60°.

2. A backrest according to claim 1, wherein said attachment members consist in bolts or screws adapted to be threadedly received in threaded holes formed inside the first side posts of the backrest frame.

3. A backrest according to claim 2, wherein the parallel slots are large enough to allow said bolts or screws to pivot as a group in said slots without being removed from said slots.

4. A backrest according to claim 2, wherein the first side posts of the backrest frame are provided with a series of threaded holes adapted to threadedly receive said attachment members, enabling height adjustment of said cushion support on said backrest frame.

5. A backrest according to claim 1, wherein the angle α is approximately equal to 45°.

6. A backrest according to claim 5, wherein the length of the parallel slots is approximately equal to 35 mm.

7. A backrest according to claim 1, wherein the length of the parallel slots lies between 10 mm and 50 mm.

8. A backrest according to claim 1, wherein Velcro fasteners are provided on one side of the straps and complementary Velcro fasteners are provided on the other side of the straps for adjusting the length of the straps.

9. A backrest according to claims 1, wherein the side bars of the cushion support are bent in at least two places, thus defining at least three successive straight sections.

10. A backrest according to claim 1, wherein the backrest frame comprises a first U-shape element and a second U-shape element, said first U-shape element comprising said two first side posts linked at their lower ends by a connection profile and said second U-shape element comprising two second side posts linked at their upper ends by a connection profile, said first and second elements being clamped together by upper clamping elements and lower clamping elements.

11. A backrest according to claim 10, wherein each clamping element consists in a plate bent at its two ends so as to define an internal space inside which one of the first side posts of the first U-shape element and the corresponding one of said second side posts of the second U-shape element are tightly disposed.

12. A backrest according to claim 11, wherein said upper clamping elements are respectively positioned along the first side posts of the first U-shape element so as to cover a section of said first side posts comprising a series of threaded holes adapted to threadedly receive said attachment members, said upper clamping elements comprising a series of corresponding holes adapted to receive said attachment members.

13. A backrest according to claim 10, wherein said upper clamping elements are respectively positioned along the first side posts of the first U-shape element so as to cover a section of said first side posts comprising a series of threaded holes adapted to threadedly receive said attachment members, said upper clamping elements comprising a series of corresponding holes adapted to receive said attachment members.

14. A wheelchair having a backrest according to claim 1.

* * * * *